Figure 8:
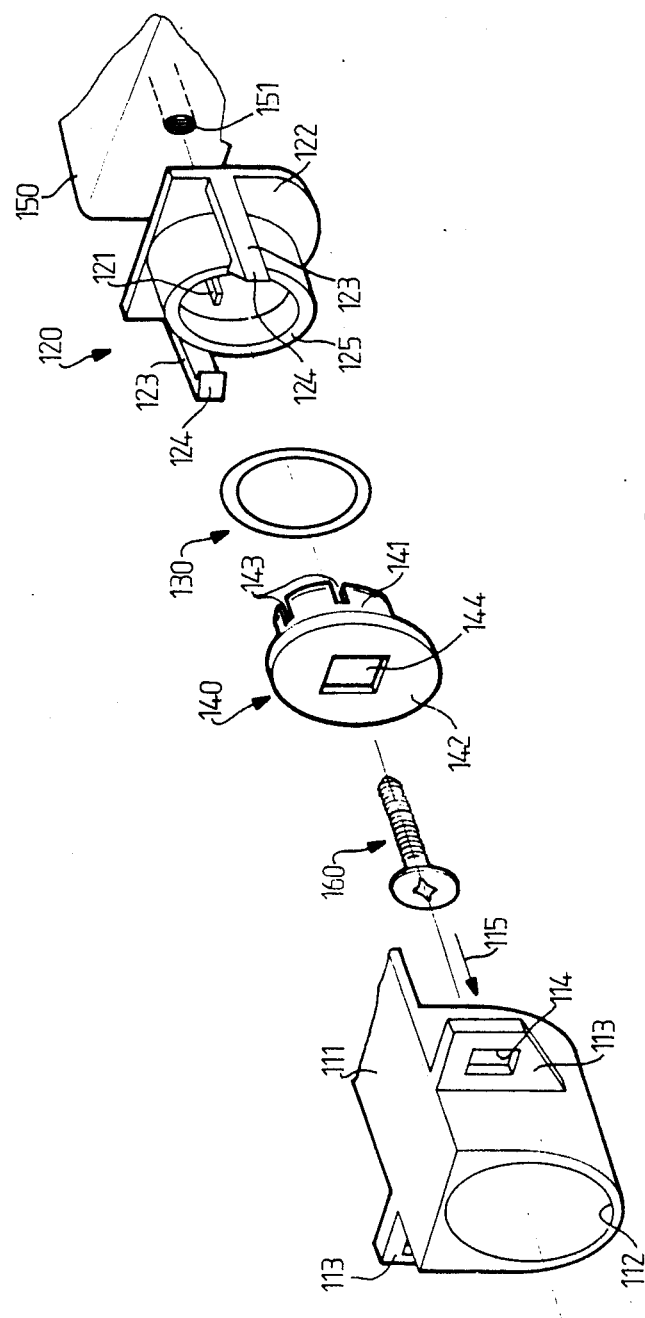

United States Patent [19]
Philippe et al.

[11] Patent Number: 4,751,619
[45] Date of Patent: Jun. 14, 1988

[54] ADJUSTABLE FIXING DEVICE, PARTICULARLY FOR AN AUTOMOBILE HEADLIGHT

[75] Inventors: Eric Philippe, St-Germain-en-Laye; Jacques Berton, Noisiel, both of France

[73] Assignee: Cibie Projecteurs, France

[21] Appl. No.: 17,155

[22] Filed: Feb. 20, 1987

[30] Foreign Application Priority Data

Feb. 24, 1986 [FR] France ................................ 86 02499
Dec. 11, 1986 [FR] France ................................ 86 17345

[51] Int. Cl.⁴ ............................................... B60Q 1/00
[52] U.S. Cl. ...................................... 362/80; 362/306
[58] Field of Search ...................... 362/61, 66, 74, 80, 362/269, 287, 288, 306, 427, 372

[56] References Cited

U.S. PATENT DOCUMENTS 4,333,131 6/1982 Hujimoto et al. ..................... 362/80
4,356,539 10/1982 Shanks ................................. 362/61
4,644,447 2/1987 Stutz et al. ........................... 362/61

FOREIGN PATENT DOCUMENTS 1288914 2/1962 France .
2188101 1/1974 France .

Primary Examiner—Willis R. Wolfe
Assistant Examiner—David A. Okonsky

[57] ABSTRACT

The invention relates to an adjustable fixing device comprising two elements (22,34) able to be displaced the one with respect to another according to a sliding relationship during an adjustment operation for the headlight, one (22) of the said elements being fixed to the headlight and the other (34) being able to be fixed on the body (56) of the automobile by a screw (52), the device further comprising a resilient locking member (46) able to co-operate with the second element and with the screw, and comprising at least one gripping edge (46a), the tightening of the said screw initially causing the abutment of the second element against the body of the automobile then, using this abutment, the resilient deformation of the said member (46) and the bringing into engagement of the gripping edge(s) (46a) with the first element (22) for assuring the clamping of the two elements in their relative position corresponding to the desired adjustment. The resilient member is for example a curved leaf spring or a resilient washer. Application to the fixing of a headlight of an automobile with adjustment of the alignment of its closure glass with respect to the body.

18 Claims, 4 Drawing Sheets

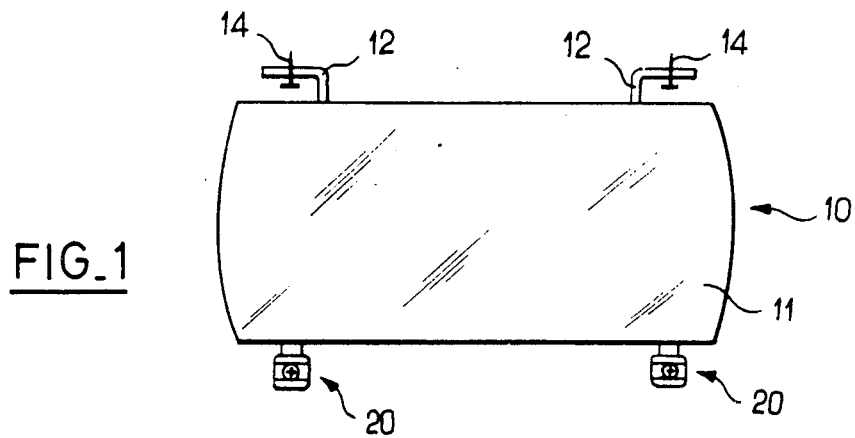
FIG_1
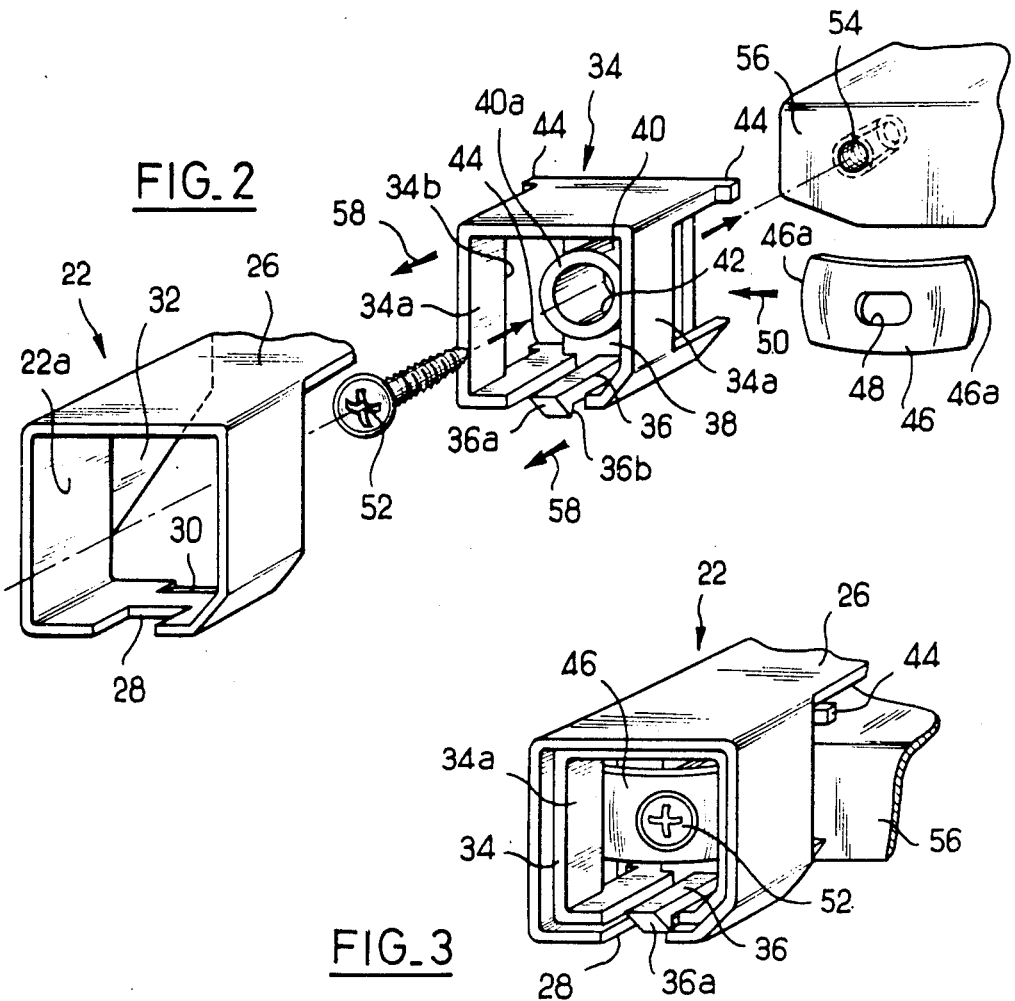
FIG_2
FIG_3

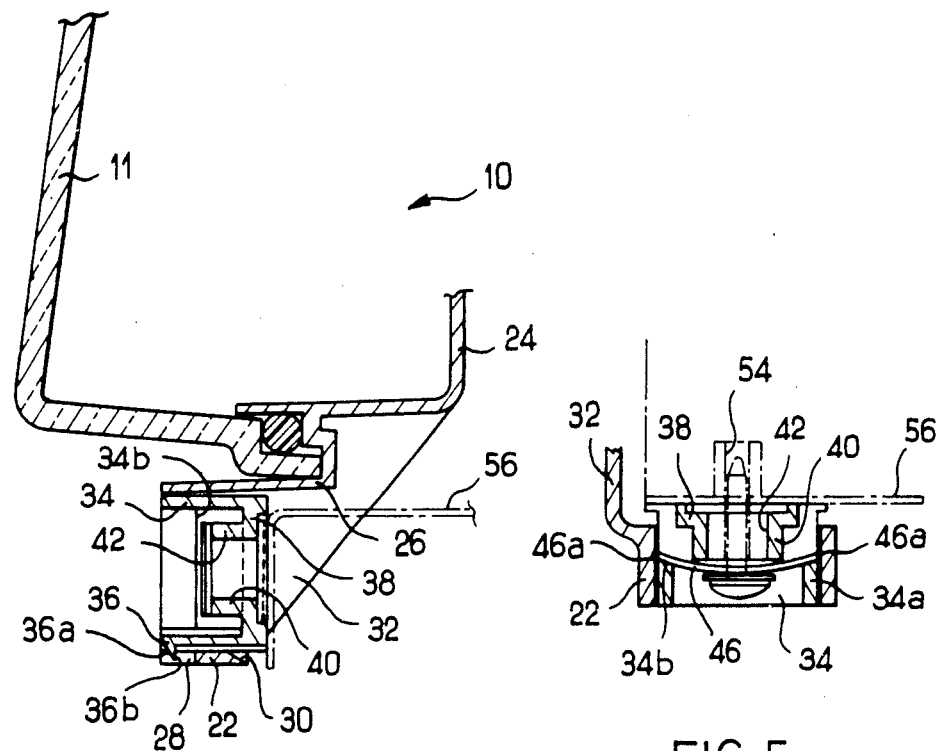
FIG. 4
FIG. 5
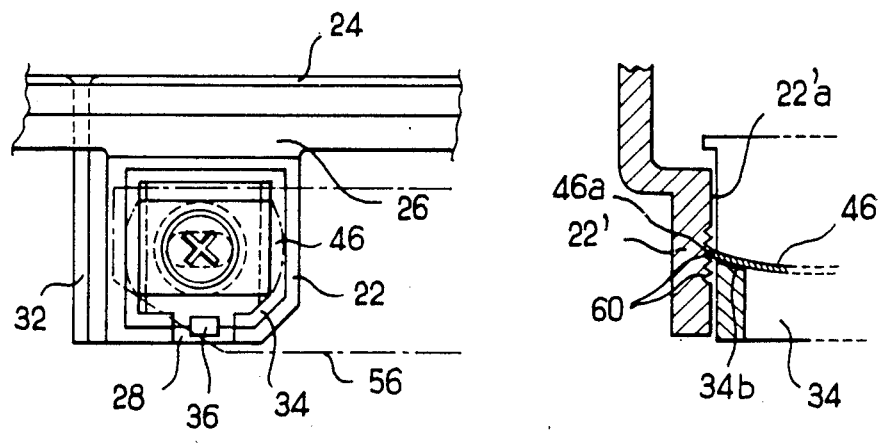
FIG. 6
FIG. 7

FIG_8

4,751,619

ADJUSTABLE FIXING DEVICE, PARTICULARLY FOR AN AUTOMOBILE HEADLIGHT

THE FIELD OF THE INVENTION

The present invention relates in a general manner to the fixing of headlights or the like on automobiles. In particular it relates to an adjustable fixing device intended for example to assure a correct alignment between the closure lens of the headlight and the neighbouring edges of the body.

BACKGROUND OF THE INVENTION

As a result of tolerances necessarily existing in the manufacture of automobile bodies, there often exists problems, of an essentially aesthetic nature, relating to an incorrect surface alignment between the closure lens of the headlight and the adjacent edges of the body. In fact, a headlight is fixed in the majority of cases not directly on the edges of the body, but to a support specially arranged inside this.

A known, but inconvenient, solution to this problem consists in placing on the screws assuring the fixing of the headlight on the body a series of spacing washers or the like of which the number is determined to assure the correct relative position between the lens and the body. However, such an adjustment procedure is extremely tedious, because the operator must time and again carry out the mounting and dismounting of the headlight, to determine by successive approaches the ideal number of washers to provide on each screw.

THE INVENTION

The present invention relieves this inconvenience of the prior art and proposes an adjustable fixing device for a headlight, which is at once extremely simple and rapid to produce, and very cheap, while assuring a firm and reliable fixing of the headlight in its correct position.

For this, the invention provides a device characterised in that it comprises two elements able to be displaced the one with respect to the other in a sliding relationship during an operation of adjustment of the headlight, one of the said elements being fixed to the headlight and the other being able to be fixed on the body of the automobile by a screw, the device further comprising a resilient locking member able to cooperate with the second element and with the screw, and having at least one gripping edge, the tightening of the said screw causing initially the abutment of the second element against the body of the automobile then, using this abutment, the resilient deformation of the said member and the bringing into abutment of the gripping edge(s) with the first element for assuring the clamping of the two elements in their relative position corresponding to the desired adjustment.

In a first embodiment of the invention, the resilient locking member has the form of a curved leaf spring which, on tightening of the screw, is deformed and comes progressively into engagement against the interior surface of walls of the first element.

In a second embodiment of the invention, the resilient member is a rubber washer, the said resilient deformation being an axial compression with lateral expansion.

THE DRAWINGS

Figure 9:
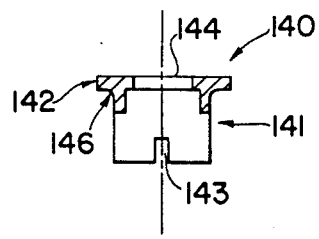
Figure 10:
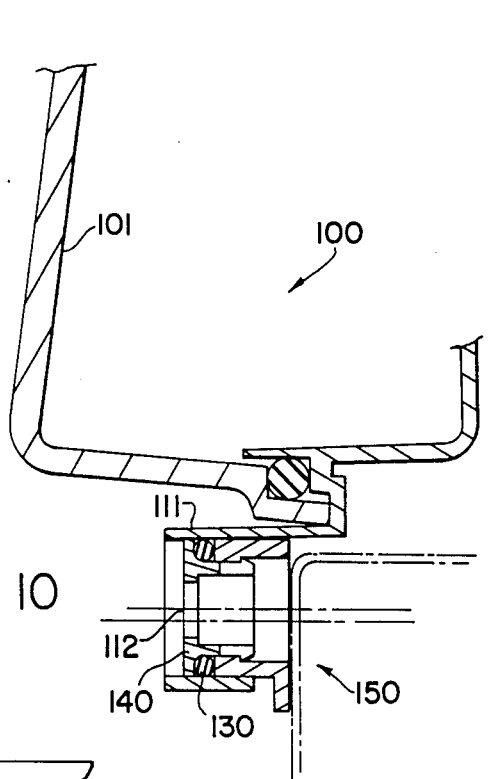
Figure 11:
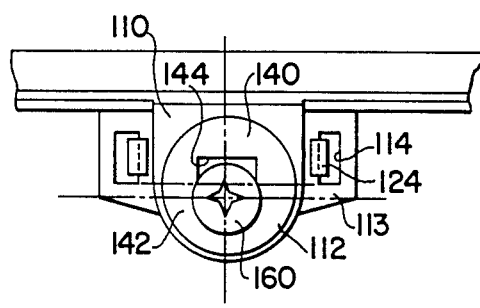
Figure 12:
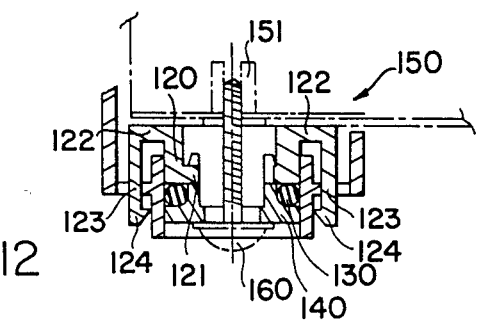

Other characteristics and advantages of the present invention will better appear from reading the following description of preferred embodiments, given by way of example and with reference to the accompanying drawings, in which:

FIG. 1 is a schematic front view of a headlight provided with adjustable fixing devices of the invention, FIG. 2 is an exploded perspective view of a fixing device in accordance with a first embodiment of the invention, FIG. 3 is a perspective view of the device mounted in position, FIG. 4 is a longitudinal vertical cross-sectional view of the device of FIG. 3, FIG. 5 is a horizontal cross-sectional view of the device of FIGS. 3 and 4, FIG. 6 is an axial end view of the device of FIGS. 3 to 5, FIG. 7 is a detailed view on a larger scale of a variant of one part of the device of FIGS. 1 to 6, FIG. 8 is an exploded perspective view of a device according to a second embodiment of the invention, FIG. 9 is a transverse cross-sectional view of an element of the device, FIG. 10 is a longitudinal vertical cross-sectional view of the device in mounted position, FIG. 11 is a side view of the device of FIG. 3, and FIG. 12 is a horizontal cross-sectional view of the device of FIGS. 3 and 4.

FIRST EMBODIMENT

Referring to the drawings, there is shown in FIG. 1, in a schematic front view, an automobile headlight shown generally as 10. It comprises in its upper region, in a known manner, two flexible tongues 12 for its fixing with a certain play on the body of the automobile, with the help of screw 14. It comprises, in addition, at two ends of its lower edge, two fixing devices 20 in accordance with the present invention, which offer in the present example a possibility of adjustment intended to assure a perfect alignment between the front closure lens of the headlight and the body, for reasons of an essentially aesthetic nature.

With reference to FIGS. 2 to 6, there will be described an adjustable fixing device according to a first embodiment of the invention. It should here be noted that the terms "front" and "rear" will be used throughout the description with reference to study of the perspective view of FIG. 2.

The device is essentially constituted by two elements. A first element or sheath 22 is fixed to the case 24 of the headlight 10 via the foot 26. More precisely, this sheath, with an axis substantially horizontal and parallel to the axis of the headlight, has a square cross-section, with the exception of one of its lower ribs, which is chamfered. Further there is arranged in the front edge of the lower horizontal part of the sheath 22 a rectangular notch 28, for a purpose explained below, and in the rear edge of the said part a ramp 30.

The sheath 22 will advantageously be made of folded metal sheet, and is here further provided with a stiffening side 32, in order that the connection between the sheath and the headlight is very rigid.

The second element of the fixing device is constituted by a slide 34 of which the external cross-section, of generally square shape, has dimensions preferably slightly less than those of the inside cross-section of the sheath, in order to provide free sliding in this in a horizontal direction, with minimal transverse play.

The slide comprises in its lower horizontal part a flexible finger 36 directed axially towards the front and of which the free end 36a is chamfered. It comprises on its lower surface a shoulder 36b able to cooperate with the notch 28 of the sheath 22, as will be explained below.

In addition, the two sides 34a of the slide 34 are substantially open throughout their rear half, for defining at mid-length two vertical abutment edges 34b.

A vertical web 38 extends between the top and bottom of the slide at the rear of it, and supports at mid-height a sleeve 40 integral with it, defining an axial traversing hole 42. The front annular end surface 40a of the sleeve is upright and substantially coplanar with the surface of the abutment edges 34b mentioned above.

Finally the slide 34 comprises, on three of its four rear corners, parts 44 projecting laterally and outwards. These projections 44 are able to cooperate with the rear edges of the sheath 22 as will be explained below.

It can be specified here that the slide 34 is preferably made as an integral whole, of rigid moulded plastics material.

The slide 34 is intended to receive a resilient locking member in the form of a leaf spring 46, made of spring steel, of generally rectangular shape and rounded on its two minor lateral edges 46a. The leaf spring 46 further has in its central region an oblong horizontally directed hole 48. It is further curved in a manner to have, at rest, a horizontal, concave towards the rear, shape, as illustrated.

The leaf spring 46 is dimensioned to be able to be mounted inside the slide 34, for example in the direction of the arrow 50 in FIG. 2, as illustrated in FIG. 3. More precisely, the lateral end regions of its front face cooperate with the abutment edges 34b of the sides 34a of the slide, whilst the central region of its rear face, in the region of the oblong hole 48, cooperates with the annular end surface 40a of the sleeve 40, as shown particularly in FIGS. 4 and 5.

It can be noted that, in this rest position, the width of the leaf spring 46 must be slightly less than the internal width of the sheath 22, to permit as will be seen below the preliminary mounting phase of the device.

Finally a screw 52 is able to be screwed into a complementary threaded hole 54 provided on a console forming part 56 of the body of the automobile, traversing, from front to rear, the central hole 48 of the leaf spring 46 and the axial hole 42 traversing the sheath. These two holes are of clearance size with respect to the external diameter of the threaded part of the screw 52.

The screw 52 has not been shown in FIG. 4, in order to avoid cluttering the drawing.

The mounting and use of the described adjustable fixing device are as follows.

As has been indicated, the leaf spring 46 is positioned in the slide 34, the holes 42 and 48 being substantially aligned.

The sleeve can then be inserted from the rear in its sheath 22, in the direction of the arrows 58. In the course of this mutual sliding movement, the chamfered end 36a of the finger 36 clears the lower part of the sheath 22 thanks to the ramp 30, and its shoulder then clicks down on the bottom of the notch 28. The various elements, in particular the finger 36 and the notch 28, are dimensioned so that, once this position is reached, the two elements 22 and 34 of the device can slide freely in a longitudinal direction between two abutments defined by the finger 36 and the projections 44, with a predetermined play, for example of the order of 3 to 5 mm. This play permits, as will be explained, adjustment of the position of the headlight 10 with respect to the body.

It can be specified here that the width of the leaf spring 46 is chosen in a manner to permit this mutual sliding. But preferably, its rounded lateral edges 46a are level with the external lateral surfaces of the slide 34. In this manner, the leaf spring 46, then deprived of its two lateral exits by the presence of the sides of the sheath, is captive in the assembly.

Once this preliminary assembly is carried out, the headlight 10 can be positioned in the automobile. Preferably, the fixing of the two upper flexible tongues 12 (FIG. 1) is carried out first, then each of the two lower assemblies 20 such as defined above is arranged opposite a hole 54 in the body, and abutted against this. The screw 52 is then placed in the respective holes 48 and 42 of the leaf 46 and of the slide 34, and tightened in the hole 54.

During the greater part of the tightening, with the aid of a conventional screwdriver, the assembly is progressively approached towards the console 56, without any stress being applied to the spring. In fact, whilst the slide is not in abutment by its rear face against the console 56, no tightening force can be effected by the screw 52 between its head and the annular surface 40a.

Once the slide 34 is in abutment against the console, the spring 46 being still at rest, manual adjustment is made of the direction of the headlight in a manner such that its closure lens, shown at 11, is perfectly aligned with the neighbouring edges of the body of the automobile. Once this adjustment has been made and held by hand, the screw 52 is turned again, which causes the pinching with a progressively increasing force of the leaf spring 46 between the head and the annular abutment surface 40a. From this, the leaf tends to lose its curved state and is flattened, and consequently its width is increased. This increase of width causes the progressive engagement of the two lateral edges of the leaf 46 with great firmness against the interior surface 22a (FIG. 2) of the lateral walls of the sheath 22, with an effect of locking via gripping. The rotation of the screw is continued to total tightening of this, tightening which contributes also to the firm fixing of the slide 34 against the console 56 of the body.

The fixing of the two elements 22 and 34 of the device is thus carried out, and hence the rigid fixing of the headlight in the desired adjustment position.

Of course, by way of variant, it will be possible to carry out the mounting by first tightening the slide 34 on the body 56, guarding against placing the leaf spring 46 under tension, then placing the sheath 22 around the slide, and finally continuing the tightening in a manner to cause the locking by resilient deformation of the leaf in the same manner as above, and at the same time the firm fixing of the slide against the body.

It can be noted here that the rounded shape of the gripping edges 46a of the leaf spring 46 permit conserving an effective clamping whilst the said leaf, mounted with a certain amount of play in the slide 34, is not oriented perfectly horizontally.

According to the nature of the material which constitutes the sheath 22, the gripping phenomenon can differ in its function. For example, if the sheath is of plastics material, firm clamping will be obtained for the main part by plastic deformation of the material. On the other hand, if the material is a metal, it is for the main part an elastic deformation of the walls of the sheath, with a relatively significant corresponding reaction force, which will assure clamping by simple friction. Of course, one can choose a material in which the effects of plastic deformation and elastic deformation are combined.

However, in all cases, the fixing obtained will be demountable by simple partial unscrewing of the screw 52, the leaf 46 then spontaneously taking up again its curved position, without the gripping cooperation with the element 22 forming an obstruction.

There is shown in FIG. 7 a variant of this first embodiment of the invention, specially adapted for when the material of the sheath is relatively hard. In this variant, a series of parallel vertical grooves is arranged in the inside surface 22'a of the sides of the sheath 22'. In the present example, the cross-section of these grooves is triangular. Thus, on tensioning of the leaf 46, each of the gripping edges 46a of this comes into spontaneous engagement with one of the grooves, for assuring with even more firmness the fixing of the two elements 22' and 34 and the fixing of the headlight.

Returning to FIG. 1, it can be noted that the adaptable nature of the fixing of the headlight in its upper region permits obtaining adjustments of different depths in the region of the two fixing devices 20, without creating substantial stresses in either of the fixings.

In addition, once the adjustment of orientation of the headlight such as described above has been made, then one can put into operation the perfectly conventional means for optical adjustment of the said headlight, which act between the case 24 of the said headlight and the reflector (not shown) situated inside the case and movable with respect to it.

Of course one can provide adjustable fixing devices such as described above in any appropriate number on the headlight, for assuring the alignment of the closure lens 11 with the body.

One can also utilise this type of device for assuring the optical alignment of the headlight.

SECOND EMBODIMENT

With reference to FIGS. 8 to 12, there will now be described a device according to a second embodiment of the invention. It should be noted that the terms "front" and "rear" used below extend from left to right in the perspective view of FIG. 8.

The device is also constituted of two principal parts. A first element 110 or sheath is rigid with the case of the headlight (not shown) by the intermediary of a foot 111. This sheath 110 has an axis substantially horizontal and parallel to the axis of the headlight. It comprises an axial bore 112 of circular cross-section. As FIGS. 9 and 10 show more precisely, the sheath comprises in addition, perpendicular to its axis, two ears 113 arranged symmetrically the one with respect to the other and each pierced with a rectangular window 114.

The second part of the device is constituted by a slide 120 of generally cylindrical form of which the external cross-section has dimensions preferably slightly less than that of the internal cross-section of the sheath, in order to provide free sliding in this in a horizontal direction, with a minimun transverse play. This slide is provided internally with a lug 121, as shown in FIG. 12, of which the purpose will be specified later in the description.

Behind the slide extends a collar 122 perpendicular to the axis of the slide. This has two fingers 123 directed axially towards the front and of which the free end 124 is in the form of a latch. These fingers are positioned laterally on one side and the other of the slide.

The slide 120 is intended to receive a resilient locking member in the form of a elastomeric washer 130. The rubber washer is dimensioned to be positioned against the front face of the slide. Its external diameter is such that it coincides with the external diameter of the slide. Its inner diameter is a diameter such that it is equal or greater than the internal diameter of the slide.

The device also has an element forming a wedge intended to hold the washer 130 against the front face 125 of the slide and to apply around the extent of the said washer, a tightening force as will be seen below.

As shown in more detail in FIG. 9, this wedge forming element 140, of hollow generally cylindrical shape, has at one end axial slots equiangularly spaced. Its other end is closed by a part in the form of a disc extending perpendicularly to the axis of the cylinder and pierced by a traversing opening 144 of square shape. The element has a shoulder 146 so that the diameter of the disc coincides with the internal diameter of the sheath, as well as the external diameter of the cylinder coinciding with the internal diameter of the elastomeric washer.

In this embodiment, the wedge forming element has four axial slots, but it can have a different number (lower or higher). In the embodiment illustrated here, the slots are positioned in such a way that their axis 145 cuts each side of the square opening at its middle.

Finally a screw 160 is able to be screwed into a complementary threaded hole 151 provided on a console forming part of the body of the automobile, traversing, from front to rear, the square opening of the wedge and the central hole of the elastomeric washer.

The mounting and use of the adjustable fixing device previously described are the following.

The slide 120 is inserted from the rear 115 of the sheath 110. During this sliding movement, the end 124 of each of the fingers 123 of the slide clicks into the windows 114 of the ears 113 of the sheath. The fingers are dimensioned such that in the mounted position, the slide and the sheath can slide over a certain distance the one with respect to the other. This play permits the adjustment of the position of the headlight with respect to the console 150 of the automobile.

The elastomeric washer 130 is then placed on the front face 125 of the slide. The wedge forming element 140 is then positioned. One of the four axial slots 143 provided in it engages on the lug 121 positioned on the internal surface of the slide. The element 140 can no longer move in rotation with respect to the rest of the device. The four axial slots thus determine four possible positions of the wedge, corresponding to a same orientation (with edges horizontal and vertical) of the square opening 144. The positioning of the wedge 140 is thus facilitated.

The screw 160 is then positioned successively traversing the square opening of the wedge; the elastomeric washer and the slide, and is screwed into the hole 151, its head abutting on the wedge 140.

During tightening, carried out in the conventional manner, the device is progressively moved towards the console 150. Once the slide comes into abutment against the console, one carries out a manual orientation of the headlight in a manner such that the closure lens 101 (see FIG. 10) is perfectly aligned with the neighbouring edges of the body of the automobile. Once this adjustment is made and held by hand, the screw 160 is turned again in the tightening direction, which causes the axial compression of the elastomeric washer 130 between the front face of the slide 125 and the disc 142 of the element 140. The axial compression of the washer causes a lateral expansion of this, and the washer, axially fixed with the slide, then is clamped by its lateral peripheral surface against the internal surface of the sheath.

The fixing of the two elements 110 and 120 of the device is thus carried out and, as a result, the rigid fixing of the headlight in its desired adjustment position is achieved.

The elastomeric washer 130 assures the clamping of the device without deformation of the internal surface of the slide, nor undergoing a premature fatigue.

It can here be noted that the cross-section of the opening 144 is advantageously greater than that of the rod of the screw 160. This permits absorption of possible transverse plays between the headlight and the hole 151 of the body.

Further, an advantage of this type of fixing is that the washer absorbs the vibrations to which the device can be submitted. It plays the role of a "silent block".

By way of variant, it is possible not to use the element 140 as described but to provide a screw of which the head has a diameter slightly less than the diameter of the sheath.

Finally, the present invention is in no way limited to the description and drawings, given by way of example only, but the man skilled in the art will incorporate variants and modifications without departing from its scope. In particular, in the first embodiment, one can provide a locking leaf spring 46 which acts on the sheath or equivalent only at one end edge, the opposite end edge being then in abutment against abutment and/or retention means provided on the slide or equivalent.

We claim:

1. An adjustable fixing device for a headlight of an automobile or the like, said fixing device comprising:
    two elements able to be displaced, one with respect to the other, according to a sliding relation during an adjustment operation of the headlight, one of said elements being fixed to said headlight and a second element being adapted to be fixed on a body of said automobile;
    a screw for fixing said other element to said body;
    a resilient locking member able to cooperate with said second element and with said screw;
    said resilient locking member comprising at least one gripping edge, tightening of said screw causing initially abutment of said second element against said body of said automobile then, using this abutment, resilient deformation of said resilient locking member and engagement of said at least one gripping edge with said first element for assuring clamping of said two elements in their relative position corresponding to a desired adjustment.

2. A device according to claim 1, wherein said resilient member has the form of a leaf spring of which the non-deformed shape is curved and which extends transversely to the direction of sliding between said two elements.

3. A device according to claim 2, wherein said resilient locking member has a pair of gripping edges, said gripping edges are two rounded opposed edges of said leaf.

4. A device according to claim 3, wherein said second element comprises a sleeve traversed by said screw and having at an end situated opposite a head of said screw an annular abutment surface, resilient deformation of said locking member in the form of a leaf spring consisting of flattening of said leaf causing an increase of the distance between its two said gripping edges.

5. A device according to claim 1, wherein engagement of said at least one gripping edge with said first element is effected by plastic deformation or of said resilient locking member.

6. A device according to claim 1, wherein engagement of said gripping edge at least one with said first element is effected with engagement of each of said gripping edges in one of a series of parallel grooves provided in said first element.

7. A device according to claim 1, wherein said first element has the form of a sheath and the second element the form of a slide received in said sheath, said at least one gripping edge of said locking member engaging with internal oppositely situated surfaces of said sheath.

8. A device according to claim 7, further comprising abutment means limiting mutual sliding movement of said two elements.

9. A device according to claim 8, wherein said abutment means comprise, on said second element, a flexible finger which, in clicking into a notch provided in said first element, assures also the preliminary assembly of said two elements.

10. A device according to claim 1, wherein said resilient member is an elastomeric washer, said resilient deformation being an axial compression with lateral expansion.

11. A fixing device according tb claim 10, wherein said gripping edge is constituted by an external peripheral surface of said elastomeric washer.

12. A fixing device according to claim 10, wherein said second element comprises, at a free end situated opposite a head of said screw, an annular abutment surface for said washer.

13. A fixing device according to claim 12, including a wedge forming element, a force of compression and expansion is produced via said wedge forming element, on which abuts said head of said screw and which has a shoulder for acting on said washer.

14. A fixing device according to claim 13, wherein said wedge forming element comprises, at one end, at least one axial slot and said second element has on its internal surface a lug intended to cooperte with said at least one axial slot in a manner to clamp said wedge forming element in rotation.

15. A fixing device according to claim 14, wherein said wedge forming element has four axial slots equiangularly spaced.

16. A device according to claim 10, wherein said first element has the form of a sheath and said second element has the form of a slide received in said sheath, said gripping edge of said locking member engaging with an internal surface of said sheath, situated opposite it.

17. A device according to claim 10, wherein said second element comprises flexible fingers which, in clicking into windows provided in said first element, assure preliminary assembly of said two elements whilst defining abutment means delimiting mutual sliding movement of said two elements.

18. An automobile headlight, comprising means for emitting a light beam, a closure lens, and at least one adjustable fixing device according to claim 1 for carrying out an alignment of said closure lens with adjacent edges of said body of said automobile.

* * * * *